INVENTOR
DAVID B. SMITH
BY Allen V. Hazeltine
ATTORNEY

Aug. 23, 1955 D. B. SMITH 2,716,151

ELECTRICAL SYSTEM

Filed July 13, 1951 3 Sheets-Sheet 2

INVENTOR
DAVID B. SMITH
BY Dean V. Hazeltine
ATTORNEY

Aug. 23, 1955    D. B. SMITH    2,716,151

ELECTRICAL SYSTEM

Filed July 13, 1951    3 Sheets-Sheet 3

INVENTOR
DAVID B. SMITH
BY Allen V. Hazeltine
ATTORNEY

United States Patent Office 2,716,151

Patented Aug. 23, 1955

2,716,151

ELECTRICAL SYSTEM

David B. Smith, Meadowbrook, Pa., assignor to Philco Corporation, Philadelphia, Pa., a corporation of Pennsylvania Application July 13, 1951, Serial No. 236,585

24 Claims. (Cl. 178—5.2)

The present invention relates to electrical systems for the transmission of intelligence, and more particularly to improved transmitting and receiving arrangements for use in the translation of color images.

Color television systems are known in the art which, under certain conditions, are operative to reproduce, at a remotely-located receiver, a color image of good fidelity and definition corresponding to that existing at a transmitter. Typical of such systems are those which may require a video frequency spectrum of 12 megacycles bandwidth for image-transmission purposes, of which 4 megacycles may be used for each of three component-color signals representative of the amounts of three additive primary colors which are necessary to match the colors of successively-scanned elements of the color image, the term "color" being used herein to indicate both the luminosity, or brightness, and the chromaticity of a light source. However, space in the electromagnetic frequency spectrum being presently at a premium, it now appears highly desirable, if not necessary, to limit the frequency components representing the image to a spectrum band of relatively small width of the order of 4 megacycles for example, for purposes of transmission.

To obtain a satisfactory color image at a receiver when the permissible transmission band is limited to such a small width, it becomes necessary to utilize the available spectrum space more efficiently for its specific purpose of translating a color image. Thus, by weighting the color information signals in accordance with the psychophysical characteristics of the human visual perceptive system, which is the final receiving element of a television system, the possibility exists of obtaining images at a receiver whose appearances are substantially the same as those which would be produced by a wide-band transmission system, while employing a substantially narrower frequency band for transmission purposes.

In addition to providing for translation of a satisfactory color image by means of a relatively narrow frequency band, it is also highly desirable in a practical color television system that the transmitted signal be susceptible of reception by a standard black-and-white television receiver to produce therein an acceptable monochrome version of the color image. This feature will be referred to as the compatibility of the color system, by virtue of which property an adequate service would be provided to owners of standard monochrome receivers in the event of conversion of television transmitters to color system standards.

Accordingly, it is an object of my invention to provide a color television transmission system comprising a transmitter and a receiver, which system is operative to translate a satisfactory color image from the transmitter to the receiver, while employing a relatively narrow frequency band for transmission purposes.

Another object is to provide such a system in which the reproduced image is characterized by an apparent definition corresponding to a video frequency band of greater width than the transmission frequency passband.

Still another object is to provide such a system in which the transmitted signals are capable of reception by conventional black-and-white television receivers, to produce therein a monochrome image of high definition.

Still another object is to provide such a system in which the transmitted signals may be received by a receiver having the form described hereinafter to produce a black-and-white image of superior quality, which receiver is also operative to receive the standard black-and-white transmission signals which presently exist.

A further object is to provide a color television system providing images of high effective definition and requiring only a relatively narrow spectrum for transmission, in which system signals representative of the brightness and chroma of the television image may be transmitted in substantially mutually-exclusive frequency bands with negligible crosstalk therebetween.

A further object is to provide an intelligence-transmission system of broad applicability, in which the useful intelligence contained in original signals having frequency components occupying a predetermined range of frequencies may be transmitted to a receiver by means of signal components occupying a frequency range substantially smaller than said predetermined range.

The general manner in which these objectives are accomplished in a color television system is as follows. At the transmitter, there are derived three signals indicative of three color-specifying parameters of successively-scanned elements of a televised scene. For reasons which will become more apparent hereinafter, these three signals are preferably such as to specify the image colors with respect to the three imaginary color primaries "X," "Y" and "Z" as defined by the International Commission on Illumination (ICI). With this choice of primaries, the Y signal represents the total brightness of the image as perceived by the human eye, while the X and Z signals contain the remaining intelligence as to image color. Since the specification of any color in terms of any given set of primaries such as X, Y and Z may be converted to a specification of the same color in terms of any other primaries by means of simple linear transformations, the transmission of the X, Y and Z signals makes available at the receiver the required intelligence from which the signals necessary to excite the three real primary-color sources may readily be derived by simple electrical matrixing circuits.

The preferred arrangement for segregating and apportioning the intelligence as to the X, Y and Z components of the color image at the transmitter, comprises means for forming the difference signals (X—Y) and (Z—Y) and for transmitting these difference signals in respectively different phase relations as amplitude-modulation of a subcarrier signal, while transmitting the Y signal in the frequency band situated below that of the modulated subcarrier. Modulation of the subcarrier is preferably effected by means of balanced modulators, so that no subcarrier signal is generated when the difference signals (X—Y) and (Z—Y) are zero, i. e. when achromatic image elements are scanned. However, when image elements having chroma are scanned, either or both of the difference signals (X—Y) and (Z—Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered as a chroma signal having a phase and amplitude representative of the hue and saturation of the color image, respectively. It will be understood that the term "chroma" is ultilized herein to indicate the hue and saturation of a color, and is therefore descriptive of the modulated subcarrier signal since the latter is utilized to control all color characteristics of the reproduced image with the exception of the brightness thereof.

Preferably, the bandwidth of the chroma signal is limited to a frequency region extending on either side of the subcarrier frequency $f_s$ by a relatively small amount $f_{c\text{-}max}$ equal to the highest frequency of the difference signals which is to be reproduced with fidelity. Since the human eye is relatively inacute in discerning abrupt color variations due to chroma changes alone, the chroma signal band ($f_s \pm f_{c\text{-}max}$) may be made relatively narrow without substantial loss of useful information. For example, the subcarrier frequency $f_s$ may be substantially equal to 3.6 mc., and the chroma signal band may extend from 3 to 4.2 mc. in a practical embodiment. The subcarrier signal frequency is also preferably so chosen as to be in opposite phases at corresponding points in successive television frames, to provide compatibility for existing monochrome receivers as described hereinafter.

The frequency region situated below the chroma signal band is then utilized for transmission of the Y signal, which represents the brightness variations of the image. In accordance with the present invention, this spectrum range is caused to contain information indicative of a band of Y signal components extending above this range, by the following means. The Y signal containing original frequency components situated above the lower limit of the chroma signal band is, in effect, heterodyned with a modulating frequency component situated above the upper frequency limit of the Y signal band, to produce a lower sideband of the modulating frequency containing new components having amplitudes corresponding to those of the original Y signal components but of reversed order in frequency. The modulating frequency is situated above the upper limit of the Y signal band by an amount less than the width of the Y signal band, so that the lower sideband thereof overlaps the original Y signal band. Frequency-selective means are then employed to select a band of original frequency components, and a band of new lower-sideband components representative of other original components, so that substantially all of the original components are represented. Included among the selected components are at least some of those in the frequency region shared by the original and the new frequency components. As a result, representation of all original Y signal components is accomplished in a spectrum band smaller than that occupied by the original components. For reasons which will become more apparent hereinafter, the modulating signal is also preferably of such frequency as to be in opposite phases at corresponding points in immediately successive television frames.

More particularly, and with reference to the system values exemplified above, a 0–5 mc. original Y signal may be supplied to a modulating or sampling arrangement, wherein it is heterodyned with a modulating signal of frequency $f_G$, which frequency may be situated at approximately 6 mc. and more particularly at a frequency which is oppositely-phased at corresponding points in successive television frames. The output of the modulating device is then passed through a filter having a pass-band 1–3 mc., the output terminal of the filter also being supplied, in effect, with the original Y signals, either by means of a D. C. component provided by the modulating signal, or by an appropriate shunt path, for example.

The output signals of the filter then comprise the original components in the frequency range 0–3 mc., plus lower sideband components produced in the range 1–3 mc. by heterodyning of the 6 mc. modulating frequency with the 3–5 mc. components of the original Y signal. These latter transposed components appear in the 1–3 mc. range in inverted order and interleaved between the original 1–3 mc. components. Since the 6 mc. modulating frequency is 1 mc. above the nearest Y signal component, no interleaved lower-sideband components are produced in the 0–1 mc. region.

The composite 0–3 mc. Y signal is then combined with the 3–4.2 mc. chroma signal for transmission in a standard television channel. When this signal is received by a standard monochrome receiver, the original 0–3 mc. components produce a black-and-white image of definition corresponding to a 0–3 mc. video frequency band. In addition, the monochrome receiver is supplied with the lower sideband components in the 1–3 mc. region and with the chroma signals in the 3–4.2 mc. region. However, since all of these latter components are in opposite phases at corresponding points in successive frames, their effects are canceled to a great extent due to the persistence of the cathode-ray tube phosphor and of the human optic system. Since no such cancellation is relied upon for signals in the 0–1 mc. region, any residual interference due to incomplete cancellation appears only at sharply-defined edges of image objects.

Reproduction in color of the image represented by the above-described transmission is accomplished as follows. Conventional receiving, amplifying and demodulating circuits are used to derive from the transmitted signal the 0–4.2 video signal formed at the transmitter. By frequency-selective means, this video signal is separated into one portion comprising substantially only components of the chroma signal and another portion comprising substantially only components of the Y, or brightness, signal. At least a portion of the separated Y signal containing the new, lower-sideband components introduced by the transmitter modulating device, is then heterodyned with a modulating signal component having a frequency equal to that of the modulating signal in the Y channel at the transmitter, to produce two new sets of components. The signals from the receiver modulating device are then preferably passed through a filter having a high-frequency cut-off below the modulating frequency, and, as in the transmitter, the output of this filter is also supplied with the originally received Y signals by means of a D.—C. component provided by the modulating signal or by a specially provided shunt path, for example.

The output signals of the receiver filter then comprise the set of original 0–3 mc. Y signal components contained in the transmitted signal, and also the original 3–5 mc. components of the Y signal which were heterodyned to a lower frequency at the transmitter and re-heterodyned to their original high-frequency positions by the receiver modulating device. These two sets of components are those which it is desired to use in controlling the brightness of the receiver image-reproducing device. The output of the receiver filter contains not only the latter two sets of desired signals, but also two sets of extraneous components whose effects tend to produce interference with those of the desired components. The extraneous components, however, are all substantially at frequencies which are of opposite phases at corresponding points in successive television frames. Accordingly, they may be caused to cancel substantially completely by application to a device which is frequency-selective to the extent of attenuating substantially such components. This frequency-selective device may conveniently be the image-reproducing device itself, operating in conjunction with the visual perceptive system of the observer. Thus, by utilizing an image-reproducing system employing phosphors of substantial frame-to-frame persistence, the values of the extraneous signals produced during each frame are, in effect, stored and added to the opposite values attained by these signals during the next frame, whereby substantial cancellation of their visual effects are achieved. Although in this instance cancellation of extraneous components is effected after the electrical signals have been changed into light signals, electronic means might alternatively be used to delete the extraneous electrical signals before application to the image-reproducing device.

To recover the separate (X—Y) and (Z—Y) signals, the chroma signal separated at the receiver is preferably demodulated by means of synchronously-operated balanced demodulators supplied with continuous-wave signals having a frequency and phase substantially identical with that of the corresponding subcarrier modulation signals employed at the transmitter. Each of the recovered difference signals may then be passed through a lowpass filter to remove all frequency components except those less than the upper limit $f_{c\text{-max}}$ of the original difference signals.

The recovered Y signal and the recovered (X—Y) and (Z—Y) signals may then be supplied through a matrix network to an image-reproducing device, which may comprise three cathode-ray tubes having phosphor screens which luminesce in response to electron-bombardment to produce light of respectively different chromaticities, together with suitable optical means for superposing images of the three screens. The characteristic light emissions of the three cathode-ray tubes then comprise the real primaries whose intensities are controlled by the television signals in such manner that the colors of successively-scanned elements of the remotely-televised image are synthesized by the optical combination of these emissions. Since the amount of each real primary color emitted for each volt of applied signal, as well as the chromaticities of these primaries, are known, well-known methods of calculation may be employed to determine the magnitudes and polarities of the signals Y, (X—Y) and (Z—Y) which should be applied to each of the cathode-ray tubes to control properly the color of the final composite color image. The parameters of the matrix network are therefore adjusted to supply these appropriate amounts of Y, (X—Y) and (Z—Y) signals to an intensity-controlling element of each cathode-ray tube.

Considering the above-outlined color television receiver system with more particular reference to the frequency values recited above in connection with the transmitter, the 1–3 mc. Y signal is separated from the 0–4.2 mc. received signal, heterodyned with a 6 mc. modulating signal, and passed through a low-pass filter to remove components above 5 mc. The output of this filter is also supplied with the received 0–3 mc. Y signals.

Accordingly, the signals at the filter output terminals comprise all of the original components in the 0–3 mc. region, plus the lower sideband components produced in the 1–3 mc. region by the transmitter modulating device. In addition, the signals at the receiver filter output comprise the original 3–5 mc. components which were transposed into the 1–3 mc. band by the transmitter but retranslated to their original and proper positions in the 3–5 mc. region by the receiver modulating device, together with the original 1–3 mc. components which were transposed by the receiver modulating device into the 3–5 mc. region. The output of the receiver filter therefore contains frequency components in the 0–5 mc. range properly representative of the original 0–5 mc. Y signal components, plus extraneous beat-frequency signals produced in the 1–5 mc. range by the transmitter and receiver modulating processes. The extraneous signals, however, are of such frequencies as to produce effects upon the receiver image-display device which tend to cancel on successive frames. Accordingly, the 0–5 mc. brightness variations are conveyed to the receiver display device with negligible interference in the 1–5 mc. region, and with no interference in the 0–1 mc. region.

The separated (X—Y) and (Z—Y) signals are supplied to the image-display device to control the relative amounts of the three additive primaries employed therein, in the general manner described hereinbefore. Chroma rendition of definition corresponding to a video frequency band of 0–.6 mc. is thereby attained, which chroma definition has been found to be adequate when accompanied by brightness definition corresponding to a 0–5 mc. range, as in the present instance. In the color television system described above, there may be no substantial amount of crosstalk between the chroma intelligence and the brightness intelligence even though both are contained within a 4.2 megacycle transmission band. Actually, such complete isolation between chroma information and brightness information is not always necessary, since some crosstalk between these channels can be tolerated. Accordingly, either the range of the brightness signal or of the chroma signal, or both, may generally be increased somewhat beyond the values indicated hereinbefore, without producing objectionable distortion of the picture.

Monochrome receivers may be constructed to make use of the effective 0–5 mc. intelligence contained in the 0–3 mc. brightness signal by including, after the usual demodulator, a low-pass filter to reject the chroma signals, followed by a 6 mc. modulating device for recovering the proper 3–5 mc. components, and a low-pass filter for rejecting higher-frequency extraneous components introduced by the receiver sampler.

It is emphasized that the values of frequency, and the specific structures mentioned above, have been set forth merely as a convenience in facilitating a general understanding of the principle of the invention. These values and structures are actually subject to wide diversification, as will become apparent hereinafter.

Other objects and features of the invention will therefore be more readily appreciated from a consideration of the following detailed description in connection with the accompanying drawings, in which.

Figure 1:
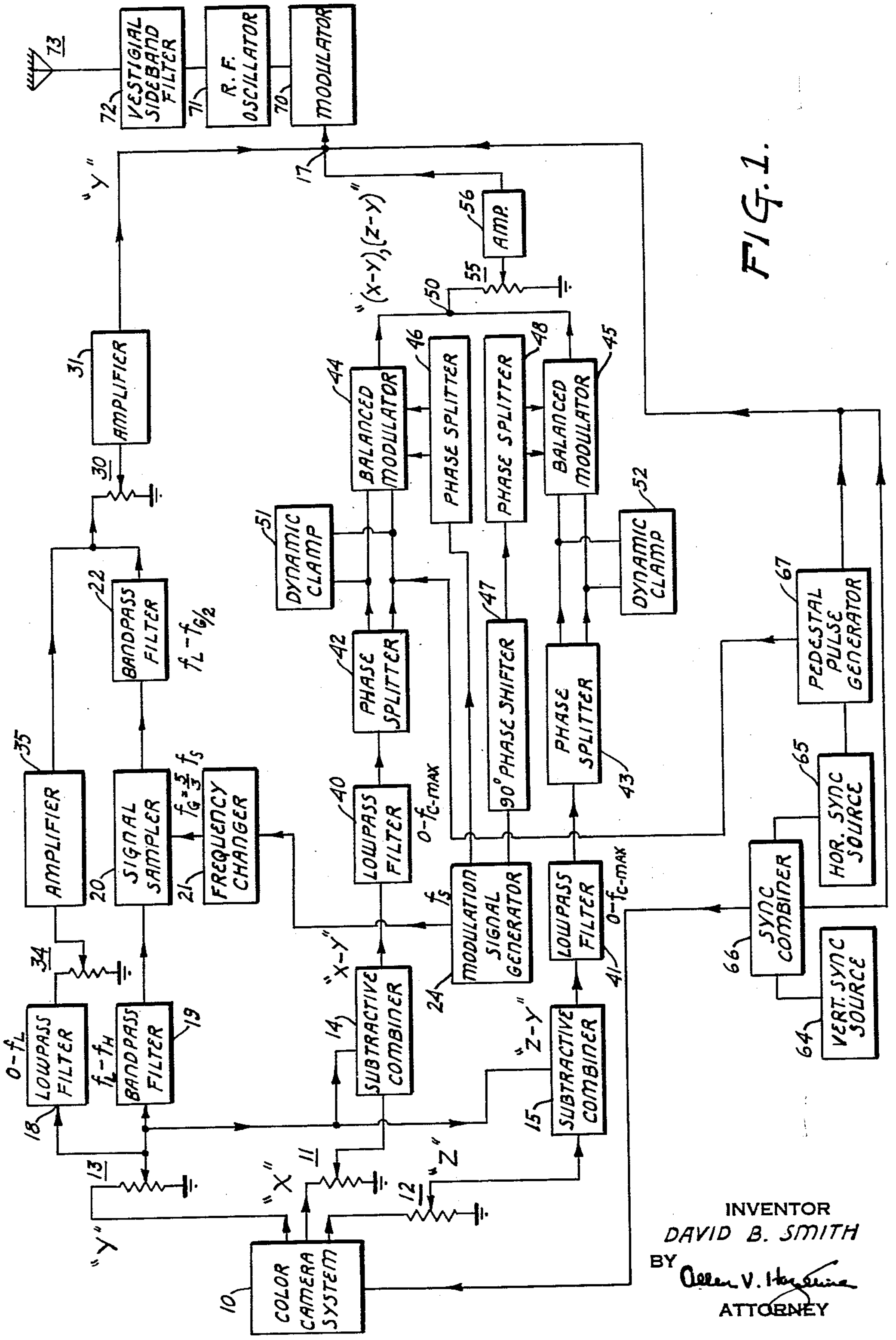
Figure 1 is a block diagram of a color television transmitter arranged in accordance with the invention.

Referring now to the color television transmitter arrangement of Figure 1, there are illustrated therein means for deriving three separate signals indicative of three color-specifying parameters of successively-scanned elements of a color television image. It is preferred in the present embodiment to specify the colors of the image with reference to the ICI imaginary primaries, X, Y and Z. This mode of color specification, and the chromaticities of these primaries, are well known in the art of colorimetry, and need not be set forth here in detail, except to point out that these primaries have such chromaticities that all real, visible colors are specified by positive amounts of the three primaries, and that the specification of the Y component of any color also specifies its apparent brightness. The first of these characteristics may be considered as resulting from the fact that the distribution coefficients or mixture curves of these three primaries are positive throughout the visible spectrum, and produces the substantial advantage that electrical signals accurately representative of the X, Y and Z components of any color may be obtained by a simple combination of photoelectric means and optical filtering devices, without requiring complex electrical synthesizing networks. The second feature above results from the fact that the mixture curve for the Y primary is identical with the luminosity curve of the human eye, and provides the substantial advantage that the Y signal derived at the transmitter is truly panchromatic, i. e. accurately representative of the apparent brightness of the image; this provides more realistic monochrome images in standard black-and-white receivers receiving the color transmissions. An additional feature of the XYZ method of color specification is that white, or shades of grey, including black, are specified by equal amounts of X, Y and Z. The advantage of this characteristic in the present system will become apparent hereinafter.

A color television system employing the XYZ method of color specification is set forth in detail in the copending application No. 225,567 of Frank J. Bingley, filed May 10, 1951, for "Electrical Systems." (Docket No. 10-302-A.) Although particularly adapted for use with such systems, the arrangement of the present invention may readily be utilized in connection with other color-specifying systems.

The color-image analyzing means of Figure 1 comprise color camera system 10, which is adapted to supply color-specifying signals representative of the X, Z and Y components of the televised image to gain-controlling devices 11, 12 and 13 respectively. Thus, camera system 10 may comprise three separate cameras viewing the color image through different optical filtering systems, one filtering system having a characteristic of transmissivity-versus-wavelength of substantially the same form as the standard mixture curve for the X primary, another having a characteristic closely approximating the Y mixture curve, and the third approximating the Z mixture curve. Accordingly, the photoelectric currents produced by these cameras are proportional to the amounts of the ICI imaginary primaries required to match the color of the televised image. It is understod that camera system 10 also includes appropriate image-scanning means for effecting conventional line and frame scanning of the image to be televised.

Gain-controlling devices 11, 12 and 13, to which the X, Y and Z signals from camera system 10 are supplied, may each comprise simple potentiometer means for effecting manual control of the magnitudes of the three color-specifying signals. The X and Z signals from gain-controlling devices 11 and 12 are supplied to one input terminal of subtractive combiners 14 and 15 respectively, while the Y signal from gain-controlling device 13 is supplied to another input terminal of each of the latter combiners. Subtractive combiner 14 is responsive to the X and Y signals supplied thereto to form at its output terminal a signal equal to the difference X—Y between the X and Y signals, while subtractive combiner 15 is similarly responsive to the Z and Y signals to produce a difference signal Z—Y at its output terminals. These combiners may each comprise a conventional twin-triode differential amplifier, or alternatively may comprise a phase inverter supplied with the Y signal and a conventional signal adder supplied with the phase-inverted Y signal and with the appropriate one of the remaining two color-specifying signals. An appropriate type of subtractive combiner is described in detail in my Patent No. 2,247,316, issued June 24, 1941 for a "Variable Gain Amplifier."

Gain-controlling devices 11, 12 and 13 are adjusted so that the X, Y and Z signals are equal when representing achromatic subject matter, as indicated by zero output from the subtractive combiners. In this way, proper adjustment of the relative magnitudes of the X, Y and Z signals is obtained, since the color-specifying parameters in the ICI, XYZ system should be equal for white or grey.

The over-all frequency passband of the system of elements utilized in deriving the brightness, or Y, signal should be at least as great as the highest video frequency $f_H$ necessary to produce the brightness definition required of the final color image at the receiver. In the particular case to be exemplified herein, the brightness signal from gain-controlling device 13 may preferably contain frequency components accurately representative of the televised scene up to a frequency $f_H$ equal to 5 mc., for example.

In accordance with the over-all system operation to be employed herein, into a relatively narrow band of low video frequencies there is compressed the useful information contained in a large band of frequencies comprising the Y signal, which in turn represents the brightness variations in the color image. The actual video frequency range utilized for transmission of the Y signal may extend from zero to an upper frequency limit $f_{co}$ equal to 3 mc., for example, but may represent the useful information contained in a frequency band of up to twice this width, although I prefer to represent thereby a range of frequency components somewhat smaller than twice the brightness signal transmission band for reasons which will become apparent hereinafter.

Accordingly, the brightness-representing Y signal from gain-controlling device 13 is supplied to a circuit arrangement which performs the following functions. Frequency components of the Y signal lying below a predetermined frequency $f_{co}$ are supplied without substantial alteration to a common video output terminal 17. Frequency components lying above $f_{co}$ are heterodyned with a modulating signal component so situated that the resulting lower-side band of the modulating signal frequency also lies substantially completely below the frequency $f_{co}$. This lower-sideband, containing components representative of the higher-frequency components of the brightness signal, is also supplied to the common video output terminal 17. The composite signal at terminal 17 then may contain, in a band ($0$–$f_{co}$), frequency components representative of all components in the original brightness signal.

Transmission of the unmodified brightness signals to the common video output terminal 17 may be accomplished by relying upon the transmissive effects of a D. C. component provided in the modulating device which also effects the desired heterodyning, or by utilizing for this purpose a specially provided direct path shunting the modulating device. Further, combinations of these two methods may be used for Y signal components lying in various frequency bands, and the arrangement now to be described employs such a combination which I prefer to use in certain applications. Other such combinations will readily occur to those skilled in the art.

Figures 3, 4, 5:
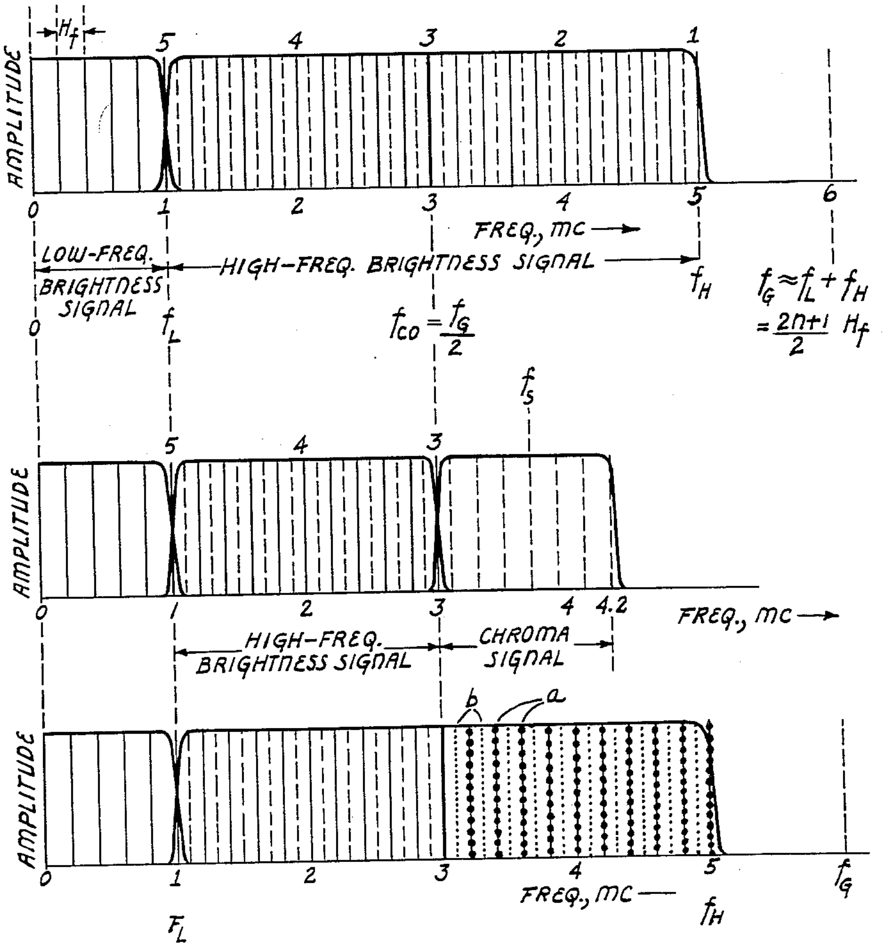
Figure 3 is a graphical illustration of the interrelationships of various signal components produced in the transmitter of Figure 1.
Figure 4 is a graphical illustration representing certain interrelationships between signal frequency components transmitted by the transmitter of Figure 1.
Figure 5 is a graphical illustration of the interrelationships of various signal frequency components produced in the receiver of Figure 2.

The details of the arrangement and operation of this portion of the system will be more readily appreciated from a detailed consideration of the particular embodiment of Figure 1 in conjunction with the graphical representations of Figures 3 and 4.

In Figure 3, the abscissae indicate values of video frequency in megacycles per second, while the ordinates are generally indicative of the magnitudes of various frequency components of the signals involved. However, for convenience in representation, actual frequencies and amplitudes of the various frequency components are not represented to scale, and the figure should not be given a significance other than that indicated hereinafter.

The solid, spaced vertical lines of Figure 3 extending from zero to five mc., represent the positions of frequency components of substantial magnitude in the original Y signal. These frequency components are situated at frequency intervals equal to the standard television horizontal scanning frequency $H_f$. The fact that substantially all of the energy content of television signals is contained in harmonics of the horizontal line-scanning frequency has been set forth in prior publications, and the explanation for this experimentally-verified fact need not be set forth again here.

In the present embodiment of the invention, the Y signal is supplied to video output terminal 17 in two parts and by two separate paths. One of these paths includes low-pass filter 18, which passes substantially only those frequencies in the range ($0$–$f_L$), where $f_L$ may equal 1 mc., for example. This range of low-frequency Y-signal components is indicated clearly in Figure 3; it represents the coarse structure of the television images and may be termed the low-frequency brightness signal.

The original Y signal is also supplied to bandpass filter 19, which may pass substantially only frequency components in the range ($f_L$–$f_H$), or 1–5 mc. This latter high-frequency brightness-signal range is also indicated in Figure 3.

The output signals of filter 19, comprising components in the frequency range ($f_L$–$f_H$) are then applied to a modulating arrangement and heterodyned therein with a locally-generated modulation signal component. This modulating arrangement comprises, in the present embodiment, a signal sampler 20 supplied with sampling or gating signals of frequency $f_G$ from a frequency changer 21, and a bandpass filter 22 having a high-frequency cut-off at $f_{G/2}$. The frequency changer 21 is supplied with continuous wave signals of frequency $f_s$ from modulation signal generator 24, and is operative to derive therefrom periodic sampling signals of a higher frequency $f_G$, $f_G$ preferably being greater than $f_s$ by a factor which is the ratio of small odd numbers, such as 5/3. Frequency changer 21 may therefore comprise a conventional circuit for multiplying the frequency of the signal supplied thereto by five, and for dividing the resultant signal by three.

Sampler 20 may comprise a normally cut-off multi-grid vacuum tube having a plate load circuit, to one control grid of which tube the gating, or modulating, signal from frequency changer 21 is supplied. By adjusting the amplitude of the gating signal to an appropriate value, the sampler tube may be caused to conduct during time-spaced intervals to produce pulses of plate current. The resultant plate current signal comprises a D. C. component nent due to the average value of the current pulses, a fundamental component at the frequency $f_G$, and higher harmonics of $f_G$. The Y signal from filter 19 may then be supplied to another control grid of the sampler tube to modulate the plate current thereof. Modulation of the D. C. component of the plate current signal will then produce, in the plate circuit, components of the original Y signal from filter 19, while modulation by the Y signal of the fundamental frequency $f_G$ of the plate current produces sidebands about $f_G$. Similar sidebands may also be produced about harmonics of the frequency $f_G$ but these harmonics and their sideboards will be rejected by a bandpass filter 22, and need not be considered.

The above arrangement comprises a conventional sampler, which may be said to possess a D. C. component by virtue of which the output signals therefrom contain the original Y-signal components as well as frequency-transposed versions thereof. However, other conventional arrangements employing balanced modulators may also be used to produce the desired lower-sideband components, in which arrangements the original signals applied thereto do not appear among the output signals thereof, and it is with such modulators that a special shunt path should be provided for the original signals in accordance with the present invention. Samplers and modulators of the above general types are well known in the art, and need not be described further here.

Referring again to Figure 3, the modulating signal frequency $f_G$ is shown located at a frequency value substantially equal to the sum ($f_L+f_H$) of the upper limits of the low-frequency Y signal and of the high-frequency Y signal, or 6 mc. in the case exemplified. Due to the existence of the D. C. component of the sampler 20, the output of the sampler includes the original frequency components supplied thereto, indicated by the vertical solid lines in the range ($f_L$–$f_H$), in their original frequency positions. In addition, however, the output of modulator 20 includes the fundamental frequency $f_G$ of the modulating signal, and the lower sideband components produced through the modulation of this signal by the Y signals in the frequency range ($f_L$–$f_H$), as indicated by the vertical dashed lines. Since $f_G$ is situated above $f_H$ by an amount substantially equal to $f_L$, these lower sideband components occupy the same frequency range ($f_L$–$f_H$) as do the original Y signals from filter 19, but are distributed throughout this range in the opposite order. Thus the original component at frequency $f_H(=5$ mc.), appears in the lower-sideband of the modulating signal at $f_L(=1$ mc.), while the original Y-signal component at frequency $f_L(=1$ mc.) appears in the lower-sideband signal at frequency $f_H(=5$ mc.). The values or original frequency to which the lower sideband components correspond are indicated approximately by the numbers above the graph.

It is to be noted that the spectrum of the output of sampler 20 includes a low-frequency range free of lower-sideband components extending from zero to frequency $f_L$, which range is exactly equal to the difference in frequency between the upper limit $f_H$ of the original Y signal and the frequency $f_G$ of the fundamental of the sampling signal. As will be pointed out hereinafter in more detail, selection of the frequency $f_G$ in this manner, to provide a low-frequency region free of lower-sideband components, permits the elimination of the shunt path to video output terminal 17 provided by the filter 18, and permits the basic low-frequency Y signal to be supplied through the same channel as the remainder of the Y signal by lowering the low-frequency cut-off of filter 19 to zero, in cases in which a positive shunt path for the basic low-frequency Y signal is not considered a practical necessity for other reasons. It is further to be noted that, as in certain arrangements mentioned hereinafter, either the upper limit $f_H$ of the brightness signal can be extended farther toward the frequency $f_G(=6$ mc.), thus increasing the information as to fine image detail, or the modulating frequency $f_G$ may be reduced toward the value $f_H(=5$ mc.), in this way decreasing the width of the spectrum required for image-representation.

In addition to the choice of the frequency $f_G$ at a value at least as great as the upper frequency limit $f_H$, a further and more exact condition is placed upon the modulation signal produced by frequency changer 21. This condition requires that the gating signal be one which is substantially of opposite phase at times separated by an interval equal to the duration of a television frame. In some instances this may be accomplished by employing a value of $f_G$ which is an integral multiple of the horizontal line-scanning frequency $H_f$, and by shifting the phase of this modulating signal by 180° once each frame, during the standard television vertical retrace time. However, the method which I prefer is to accumulate the required 180° phase difference at a constant rate during the scanning of each frame, which may be accomplished, for example, by selecting $f_G$ to be equal to an odd integral multiple of one half the line scanning frequency, or $$\frac{2n+1}{2}H_f$$

where $n$ is an integer. Such a signal is inherently in opposite phase at intervals equal to the period of one television frame.

Furthermore, this phase alternation during successive frames also occurs for all frequencies differing from this value of $f_G$ by multiples of the horizontal line-scanning frequency $H_f$. Consequently, each of the lower-sideband components represented by the vertical dashed lines of Figure 3 is also such as are in opposite phase at the same points in successive frames. This arrangement, by means of which the sampling frequency $f_G$ and all the lower-sideband components thereof are caused to be in opposite phases at corresponding points of successive frames, is indicated in Figure 3 by the location of these frequency components at frequencies exactly intermediate the harmonics of $H_f$ comprising the original Y signal.

Although I prefer to use values of the modulating frequency $f_G$ which are equal to $$\frac{2n+1}{2}H_f$$

any modulating signal which satisfies the condition of opposite phases at the same point in successive frames, will have sideband components which also satisfy this condition. For example, the arrangement mentioned above, in which the phase of the modulating signal is arbitrarily reversed at the beginning of each frame, may be employed. It is also possible in some instances to make use of values of $f_G$ which differ from $$\frac{2n+1}{2}H_f$$

by multiples of the television frame rate of 30 cycles per second, since the desired phase relation will then still obtain.

The output signals from sampler 20, comprising the original Y signal in the range $(f_L-f_H)$, the modulating signal of frequency $f_G$, and the lower-sideband components of $f_G$ produced by the original Y signal, are all supplied to bandpass filter 22, which passes substantially only components of frequencies less than one-half the modulating frequency $f_G$. As is indicated in Figure 3, the high-frequency cut-off $f_{co}$ of filter 22 occurs at 3 mc. for the case exemplified. The output signals from filter 22 may then be supplied to the transmitter video output terminal 17, by way of gain-controlling device 30 and amplifier 31.

The low-frequency Y signal in the range $(0-f_L)$ from filter 18 is also supplied to video output terminal 17, through the shunt path provided by gain-controlling device 34 and amplifier 35, and through the common path comprising gain-controlling device 30 and amplifier 31. The video signal at terminal 17 therefore comprises the low-frequency Y signal in the range $(0-f_L)$, or 0–1 mc., and another signal in the frequency range $(f_L-f_{g/2})$, or 1–3 mc., which includes components principally at harmonics of the horizontal line-scanning frequency $H_f$ and directly representative of the corresponding components of the original Y signal in the frequency range 1–3 mc., the latter signal frequency range also including frequency components interleaved between the harmonics of $H_f$ and representative of the intelligence contained in the 3–5 mc. region of the original Y signal. By choosing the high frequency cut-off of filter 22 at $f_{G/2}$, each of the original frequency components in the range 1–5 mc. is represented by a single component in the 1–3 mc. spectrum.

A signal of this same form can also be obtained by permitting the basic, low-frequency Y signal in the range $(0-f_L)$ to pass through sampler 20 along with the remainder of the Y signal, and by eliminating the shunt path provided by filter 18, gain-controlling device 34, and amplifier 35. This corresponds to the condition in which filter 19 is designed to pass the entire frequency range $(0-f_H)$. In this event, for the reasons hereinbefore pointed out, the basic, low-frequency Y signal will pass directly through sampler 20, due to the D. C. component provided by the modulating or gating signal, and, if the low-frequency cut-off of filter 22 is also reduced to zero, will appear at terminal 17 free of lower-sideband components due to the choice of $f_G$ at a value equal to $(f_H+f_L)$.

Referring now to Figure 4, which is a graphical representation of the spectrum of the complete image-representing video signal at terminal 17, in which the coordinate axes have the same significances as in Figure 3, the complete video signal is seen to comprise not only the (0–3) mc. Y signal described above, but also a (3–4.2) mc. chroma signal, the derivation of which will now be briefly described.

The X—Y signal from subtractive combiner 14 is supplied to low-pass filter 40, while the Z—Y signal from subtractive combiner 15 is applied to low-pass filter 41. The high-frequency cutoff of filter 40, designated $f_x$, and the high frequency cutoff $f_z$ of filter 41, are preferably equal and will be designated by the symbol $f_{c-max}$. In a preferred embodiment, $f_{c-max}$ may equal 0.6 mc., for example, this relatively small frequency bandwidth being permissible in view of the fact that the difference signals X—Y and Z—Y exist only when departures of the image chromaticity from black-and-white are to be represented, and to the fact that the human eye is unable to make use of information as to chroma variations comprising abrupt spatial discontinuities.

The band-limited difference signals from filters 40 and 41 are then supplied to conventional phase splitters 42 and 43, respectively. These phase splitters may each conveniently comprise a triode amplifier stage having plate and cathode load circuits of equal impedances, and are operative to convert the (X—Y) and (Z—Y) signals into push-pull form. The push-pull difference signals thus formed are then supplied to balanced modulators 44 and 45 respectively, wherein they are employed to amplitude-modulate a signal of frequency $f_s$ derived from modulation signal generator 24. This subcarrier signal is supplied to balanced modulator 44 directly through phase splitter 46 and to modulator 45 through 90° phase shifter 47 and phase splitter 48. Balanced modulator 44 may comprise, in the present embodiment, a pair of pentagrid vacuum tubes having their cathodes grounded through a common resistor, their suppressor grids connected to their cathodes, their second and fourth grids supplied with positive potential from a suitable source, and their plates supplied with positive potential through a common plate load circuit. One half of the push-pull X—Y signal may be supplied to the third grid of one of this pair of tubes, and the other half to the third grid of the other tube of the pair. The first control grids of the above pair of tubes may then be supplied with a push-pull continuous-wave, sinusoidal signal from modulation signal generator 24, by way of conventional phase splitter 46. Modulation signal generator 24 is preferably of high frequency stability, and produces a sinusoidal signal of frequency $f_s$, which may be approximately 3.6 mc., and is of such frequency as to be in opposite phases at corresponding points in immediately successive television frames. This will be accomplished if $f_s$ is an odd integral multiple of one-half the horizontal line scanning frequency $H_f$.

The function of the above-described balanced-modulator arrangement is to effect multiplication of the (X—Y) signal by the sinusoidal modulation signal of frequency $f_s$. This operation is produced by virtue of the separate amplitude-modulation of the continuous-wave signal from generator 24 in the two tubes, and by the addition of the two resulting signals by means of a common plate load circuit. In the absence of (X—Y) signals, the signals produced by the two tubes across the common plate load circuit are equal and opposite, so as to cancel, and no output signal is produced under these conditions. However, when the X—Y signal is other than zero, the gain of one tube is increased and that of the other tube is decreased, so that a net output signal is produced. In this way, the carrier components are suppressed when transmitting achromatic picture information.

Balanced modulator 45 may be substantially identical with modulator 44. Since the arrangement and operation of such balanced modulator arrangements are well known, it will not be necessary to describe further the detailed arrangement and operation thereof.

However, it is important to note that the subcarrier signal supplied to modulator 45 is delayed by 90° in phase with respect to that supplied to modulator 44, and that, accordingly, the two difference signals X—Y and Z—Y are modulated upon subcarriers which are in quadrature relation. The two quadrature-related, phase-modulated subcarriers produced by modulators 44 and 45 are then combined at terminal 50, as by means of a common plate load circuit, for example.

Across the two input terminals of modulators 44 and 45, respectively, it is preferable to connect a pair of dynamic clamps 51 and 52. These devices are preferably employed so as to maintain the (X—Y) and (Z—Y) signal values representative of the blanking level at a substantially constant level despite variations in either sense in the average values of these difference signals. Since the difference signals X—Y and Z—Y may depart from zero in either sense depending upon the chromaticity of the scene, ordinary clamping or leveling devices which tend to eliminate all signals on one side of the blanking level are inappropriate here. The dynamic clamps here employed constitute, in effect, gated clamping devices which are rendered operative only during the horizontal blanking intervals to clamp the difference signals at a predetermined reference value at such times. Arrangements of this type are well known in the art, and are described in detail in U. S. Patent No. 2,299,945 of K. R. Wendt for a "Direct Current Reinserting Circuit," for example.

Due to the use of balanced modulators, the resultant signal at combining terminal 50 is zero when the difference signals (X—Y) and (Z—Y) are zero, i. e. when achromatic image portions are being represented. At other times, the combined signal at terminal 50 comprises the sum of the outputs of the two balanced modulators, each of which has a fixed phase but has an amplitude which varies in accordance with the difference-signal intelligence. The combined signal at terminal 50 therefore comprises a resultant amplitude-modulated subcarrier whose phase is dependent upon the relative amplitudes of the two amplitude-modulated sinusoids from which it is derived. The phase thereof is therefore indicative of the hue of the television image. The amplitude of this subcarrier signal increases with increases in the magnitudes of the difference signals, and thus with increasing departures of the image color from white or grey. The subcarrier amplitude therefore is indicative of the saturation of the image color.

The amplitude-and-phase-modulated subcarrier thus formed at combining terminal 50 may then be supplied through gain controlling device 55 and amplifier 56 to the transmitter video output terminal 17, for combination with the Y signal.

Referring to Figure 4, one factor determining the choice of the subcarrier frequency $f_s$ will be readily observed. In the system here set forth, it is desired to maintain frequency separation between the Y signal and the chroma signal, while utilizing the narrowest possible transmission spectrum. Accordingly, the subcarrier frequency $f_s$ is preferably chosen to be substantially equal to $(f_{G/2}+f_{c-max})$, so that the extreme lower sideband of the chroma subcarrier corresponds to the upper frequency limit $f_{G/2}$ of the Y signal. A further condition is that $f_s$ be in opposite phase at the same points in successive television frames, and it may therefore be made equal to an odd integral multiple of one-half the horizontal line-scanning frequency $H_f$. As indicated hereinbefore, it is also a practical convenience to employ a value of $f_s$ which is related to the modulating frequency $f_G$ by the ratio $a/b$ of small whole numbers; for example, $f_G$ may equal 5/3 $f_s$. To satisfy these conditions simultaneously, the factor by which the subcarrier frequency $f_s$ exceeds $H_{f/2}$ should be an odd integral multiple of the denominator $b$ of the ratio $a/b$ by which $f_G$ exceeds $f_s$.

Subject to the above conditions, the subcarrier frequency $f_s$ may be chosen substantially equal to 3.6 mc. for the case in which the greatest difference-signal frequency $f_{c-max}$ is 0.6 mc. The chroma signal frequency band then extends from 3 to 4.2 mc. or from $f_{G/2}$ to $(f_s+f_{c-max})$. It is noted that the original difference signals (X—Y) and (Z—Y) comprise substantially only components at harmonics of the horizontal line-scanning frequency $H_f$, for reasons which will be apparent from the above discussion of the Y signal. Therefore, when these difference signals modulate the chroma subcarrier frequency $f_s$ to produce sidebands thereabout, the sideband components differ from $f_s$ by harmonics of $H_f$, and are therefore also of such frequency as to be in opposite phases at the same points in successive television frames.

From the foregoing, it will be apparent that the complete video signal at terminal 17, having the spectrum represented in Figure 4, occupies a total frequency band extending from zero to $(f_s+f_{c-max})$, or from 0–4.2 mc. This signal, however, represents the useful intelligence contained in the 5 megacycle Y signal extending from 0 to $f_H$, as well as that contained in the two 0.6 mc. difference signals (X—Y) and (Z—Y).

To the complete image-representing signal at video output terminal 17, there are added appropriate synchronizing signals, in the following manner. Conventional vertical and horizontal synchronizing pulses are generated in vertical sync source 64 and horizontal sync source 65, respectively, and may be combined in sync combiner 66 for application to the color camera system 10 to control the scanning mechanism therein. The mixed sync from sync combiner 66 is also supplied to the common video output terminal 17 for transmission with the image-representing signals. In addition to these conventional synchronizing signals, it is desirable in the present embodiment of the invention to transmit along with the image-representing signals, a color-synchronizing signal comprising a burst of the subcarrier signal of frequency $f_s$, situated on the "back-porch" of the blanking pedestal, that is, in the blanking intervals immediately following the terminations of horizontal sync pulses. To accomplish this, there is employed pedestal pulse generator 67, which is supplied with signals from the horizontal sync source 65, and is responsive thereto to derive pedestal pulses occurring during the above-mentioned "back-porch" intervals. These pulses are supplied to one input of balanced modulator 44, for example, and produces unbalance of this modulator during the "back-porch" intervals with the result that a burst of the subcarrier signal at frequency $f_s$ is caused to occur during these intervals. In order that this burst of carrier may lie substantially completely on the same side of the blanking level as do the conventional horizontal sync pulses, pedestal pulses from generator 67 are also supplied to video output terminal 17 in appropriate polarity to prevent the peak excursions of the subcarrier burst from penetrating, to any substantial degree, the amplitude region reserved for image-representing signals.

The complete video signal, including synchronizing signals, may then be transmitted upon a radio-frequency carrier in the conventional manner. Thus, the complete video signal at terminal 17 is supplied to modulator 70, to amplitude-modulate the signal generated by radio-frequency oscillator 71 in accordance with the video intelligence. The amplitude-modulated carrier signal from oscillator 71 may then be passed through conventional vestigial sideband filter 72 to antenna 73 for radiation into space.

The high degree of compatibility of the signal radiated by the transmitter of Figure 1, when received by a standard black-and-white receiver, will be appreciated from the following. The transmitted signal differs from the standard monochrome signal principally in the presence of lower-sideband components of the modulating frequency $f_G$ in the 1–3 mc. portion of the Y-signal spectrum, and in the presence of the chroma signal in the frequency range 3–4.2 mc. However, both of these bands of extraneous signals comprise substantially only frequency components having opposite phases at the same point in successive frames. Due to the combined integrating action of the phosphor of the receiver cathode-ray tube and of the eye of the observer, substantially only the average effects of the extraneous signals are observed. Since these effects are opposite during successive frames, their average is substantially zero, and substantially complete cancellation of the effects of the extraneous signals is achieved. Generally, however, this cancellation is not entirely perfect, and a small degree of residual interference may be visible under certain circumstances. It is principally for this reason that the system has been arranged to provide a basic lower-frequency range (0–1) mc. in the Y-signal channel, in which there are no interfering signals. By this means, all image regions but those containing relatively fine detail are made entirely free of all residual interfering effects such as might occur due to incomplete cancellation of components extraneous to the standard black-and-white signal. It is also to be noted that future black-and-white receivers in accordance with this system would need a passband at full amplitude of only 3 mc., while the remaining frequency space below the sound carrier may be used for phase correcting purposes with less than full amplitude of transmission, since the information about chroma contained in this part of the spectrum is not utilized in such a receiver.

Figure 2:
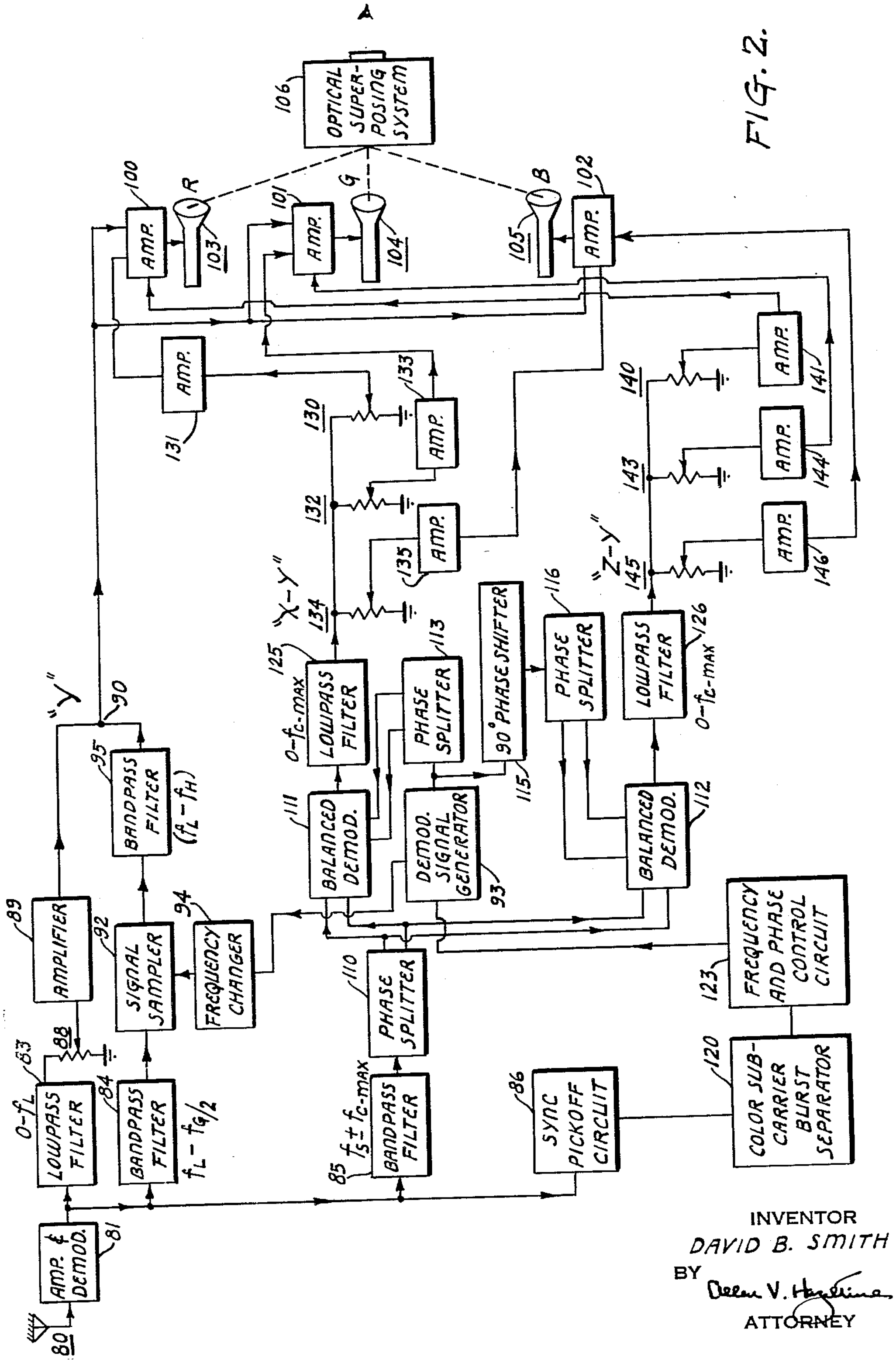
Figure 2 is a block diagram of a color television receiver adapted to reproduce a color-image from the transmissions of the transmitter of Figure 1.

Referring now to Figure 2, the color television receiver arrangement represented therein is responsive to the transmissions of the transmitter of Figure 1, to produce a final color image characterized by five megacycle definition as to brightness variations and by 0.6 megacycle definition as to chroma variations, with no substantial interference due to crosstalk between the brightness, or Y, signals and the chroma signals. Thus there may be employed a receiving antenna 80 for intercepting the modulated carrier-wave signal from transmitting antenna 73, and an amplifier and demodulator 81 for producing, at a substantial level, video signals substantially identical to those at the video output terminal 17 of the transmitter. The receiving antenna and the amplifier and demodulator may be designed in accordance with techniques well known in the art.

The next operation performed in the receiver is to separate the basic low-frequency Y signal in the range $0–f_L$, the higher-frequency components of the Y signal in the range $f_L–f_{G/2}$, the chroma signal in the range $f_{G/2}–(f_s+f_{c-max})$, and the subcarrier synchronizing signals, each into a different channel. Accordingly, the composite video signal from amplifier and demodulator 81, as represented in Figure 4, is applied in parallel to low-pass filter 83, which passes substantially only frequency components in the one-megacycle, low-frequency Y-signal range $(0–f_L)$, to bandpass filter 84, which passes substantially only the 1-3 mc. higher-frequency components of the Y signal lying in the range $(f_L–f_{G/2})$, to bandpass filter 85, having a 1.2 megacycle passband extending from $(f_s-f_{c-max})$ to $(f_s+f_{c-max})$ for passing the chroma signal, and to sync pickoff circuit 86, which may be a conventional amplitude-selective monochrome television synchronizing-pulse separator.

The basic low-frequency Y signal from filter 83 is supplied through gain-controlling device 88 and amplifier 89 to a combining terminal 90, and is properly representative, without modification, of the low-frequency portion of the Y signal. The remainder of the Y signal, however, contains both the original components of the Y signal in the region $(f_L–f_{G/2})$ or 1–3 mc., and lower-sideband components interleaved therewith which are representative of the high frequency Y signals in the $(f_{G/2}–f_H)$ or 3–5 mc. region. To rearrange these components into an order suitable for utilizaiton, the output of filter 84 is supplied to a modulation device which may be substantially identical with that employed in the transmitter. Thus it may comprise a signal sampler 92, a source of sampling signals comprising demodulation signal generator 93 and frequency changer 94, and a bandpass filter 95 having a high-frequency cutoff at frequency $f_H$, the frequency changer 94 and sampler 92 being so arranged as to produce a sampling signal of fundamental frequency $f_G$ in the sampler, which has a D. C. component as in the case of the transmitter arrangement described hereinbefore. Since the modulation device is again characterized by the utilization of a sampling signal providing a D. C. component, the output of sampler 92 includes the original Y components in the frequency range 1–3 mc. which are represented by the solid lines in the corresponding portion of Figure 5, as well as the interleaved lower-sideband components indicated by the dashed lines in the same region of Figure 5.

In addition, two other sets of frequency components are formed by intermodulation of the received components with the sampling signal of frequency $f_G$. These latter sets of frequency components comprise the received components in the 1–3 mc. region transposed to the 3–5 mc. region and reversed in order. Furthermore, since the modulating frequency $f_G$ is at an odd integral multiple of one-half the line-scanning frequency $H_f$, the received lower-sideband components indicated by the dashed lines are transposed by the heterodyning process to values in the 3–5 mc. range which are harmonics of $H_f$, as indicated by the dotted solid lines *a*. Consideration of Figures 3, 4 and 5 will reveal that these latter transposed components now occupy precisely the same positions which they occupied in the 3–5 mc. portion of the Y signal at the transmitter before sampling. In this manner, the frequency portion of the Y signal in the range $(f_{G/2}–f_H)$ is reconstituted.

However, the original frequency components at harmonics of $H_f$ in the 1–3 mc. portion of the received signal, when transposed to the 3–5 mc. region, are situated precisely intermediate harmonics of $H_f$, as indicated by the dotted lines *b* of Figure 5, and are therefore of opposite phases at corresponding points in successive television frames.

Other higher frequency products of sampler 20 may also be formed, but these are rejected by passing the sampled signal through bandpass filter 95, having a passband in the frequency range $(f_L–f_H)$.

The output of filter 95 therefore comprises four groups of components. One group is that representative of the 1–3 mc. components of the Y signal which pass directly through the transmitter modulation device and the receiver modulation device due to the D. C. components thereof. This group is represented by the solid vertical lines in the 1–3 mc. portion of Figure 5. A second group comprises components originally representative of the 3–5 mc. components of the Y signal, which have been transposed to a lower frequency range by the transmitter modulation device but restored to their original positions by the reciprocal action of the receiver modulation device. These are represented by the dotted solid lines of the same figure. These first and second portions of the signal from filter 95 together constitute a signal properly representative of the 1–5 mc., or $(f_L–f_H)$, portion of the original, brightness-representing Y signal. This proper signal is combined at terminal 90 with the basic low-frequency signal representing the 0–1 mc. portion of the original Y signal, to produce a 0–5 mc. signal representing the useful information in the original 0–5 mc. Y signal at the transmitter.

The third and fourth portions of the signal from filter 95 comprise undesired, extraneous beat signals introduced by the inherent operations of the transmitter and receiver modulation devices. One of those portions comprises the original 1–2 mc. components of the Y signal which pass through the transmitter modulation device on the D. C. component thereof, in substantially unchanged form, but which are transposed by the receiver modulation device to frequencies in the 3–5 mc. range which are in opposite phases at corresponding points in successive frames, as represented by the dotted vertical lines *b* of Figure 5. The other extraneous group comprises the original 3–5 mc. Y signal components which are transposed only by the transmitter modulation device, to frequencies in the 1–3 mc. region which are of opposite phases at corresponding points in successive frames, and which are represented by the vertical dashed lines in the figure.

The reconstituted Y signal properly representative of frequency components in the range 0–5 mc., together with extraneous components in the 1–5 mc. region, is then supplied through combining amplifiers 100, 101, and 102 to the red, green and blue image-reproducing devices, respectively, to control the intensities of the light emitted thereby. Although the color image-reproducing means may, in some instances, comprise a single tube of special design, the apparatus utilized for color-image reproduction in the present instance comprises three separate cathode-ray tubes 103, 104 and 105 having luminescent screens producing light of the chosen red, green and blue additive primary colors, respectively, together with an optical superposing system 106 which provides an observer with precisely superposed images of the screens of the three cathode-ray tubes, whereby color mixture is obtained. By suitable adjustment of the gains of amplifiers 100, 101 and 102, the superposed images of the three cathode-ray tube screens may be made acromatic when supplied only with the reconstituted Y signal from terminal 90. Thus, the Y signal is caused to control the formation of a resultant black-and-white image comprising white-brightness changes only, which resultant image has a definition corresponding to a 5 mc. video frequency band. It is understood that appropriate deflection-controlling circuits (not shown) are also employed to secure synchronized scanning of the three cathode-ray tube screens.

As has been pointed out hereinbefore, the extraneous components in the Y signal applied to the three receiver cathode-ray tubes 103, 104 and 105 are composed substantially only of components having frequencies such that they are of opposite phases at corresponding points in successive television frames. The effects of these extraneous signals upon the appearance of the cathode-ray tube images are therefore opposite during successive frames, and hence tend to cancel due to the averaging effects exerted by the persistence of the tube phosphors and of the optic system of the observer.

The same considerations apply to the use of the path provided for the basic, low-frequency Y signal by filter 83 in the receiver, as apply in the case of the path provided by filter 18 in the transmitter. Thus, filter 83 may be omitted, if not deemed a practical necessity, and the low-frequency cut-off of filter 84 reduced to zero frequency to permit the passage of the basic Y signal along with the remainder of the Y signal. The basic Y signal will then pass through sampler 92 directly, due to the D. C. component of the sampling signal. The low-frequency cut-off filter 95 should then also be reduced to zero frequency, to permit passage of the low-frequency Y signal. The lower-sideband components produced by intermodulation of the low-frequency Y signal with the modulating signal component of frequency $f_G$ will then be rejected by filter 95, and no additional extraneous signals are occasioned by this arrangement.

It is also noted that cancellation of extraneous signals is not relied upon in reproducing the low-frequency Y signal in any event, since the 0–1 mc. region of the spectrum is at no time contaminated with extraneous signals.

Having caused the brightnesses of the three cathode-ray tubes to vary in accordance with the variations in the original 0–5 mc. Y signal, it then remains to supply each of the receiver tubes 103, 104 and 105 with appropriate amounts of the difference signals (X—Y) and (Z—Y), so as to add the proper chromaticity to the final resultant image. Accordingly, the separated chroma signal from bandpass filter 85 is supplied first to phase splitter 110, and thence to balanced demodulators 111 and 112. Demodulator 111 is generally similar to balanced modulator 44 at the transmitter, being supplied with continuous-wave signals of the subcarrier frequency $f_s$ from demodulation signal generator 93 through conventional phase splitter 113, while balanced demodulator 112 is similar to balanced modulator 45 at the transmitter, being supplied with the signal of frequency $f_s$ from demodulation signal generator 93 by way of 90° phase delay device 115 and phase splitter 116. It is understood, however, that the output signals of the demodulators are maintained separate, rather than combined as at the transmitter. To establish the demodulation signal generator 93 at an operating frequency $f_s$ identical with that of the transmitter modulation signal generator 24, the signal from sync pickoff circuit 86 comprising horizontal sync pulses and color carrier bursts, is supplied to color carrier burst separator 120, which may be a frequency selective device passing substantially only frequency components at or adjacent the chroma subcarrier frequency $f_s$. The output signal of subcarrier burst separator 120 therefore comprises oscillations at the frequency $f_s$ which have a phase bearing a predetermined relation to the phase of the subcarrier signal. These bursts may be applied to frequency and phase control circuit 123, which operates to control the demodulation signal generator 93 in such a way as to cause the phase and frequency of the output signals thereof to correspond with those of the separated color carrier bursts. Although any of a variety of circuit arrangements may appropriately be utilized for this purpose, a particularly suitable arrangement is described in detail in the copending application Serial No. 197,551, of Joseph C. Tellier, entitled "Improved Signal Control Circuit" and filed November 25, 1950.

The output of balanced demolulator 111 is preferably passed through low-pass filter 125, having a passband extending from zero to a frequency $f_{c-max}$, the output signals of this filter then comprising the separated X—Y signals in a frequency band 0–.6 mc., in the present embodiment. Similarly, the output signal from balanced demodulator 112 is preferably passed through low pass filter 126, also having a passband 0–$f_{c-max}$, whereby there is obtained the separated Z—Y signal in the band 0–.6 mc.

Although a detailed analysis of the theory of operation of the transmission system comprising the transmitter and receiver arrangement utilized for translation of the X—Y and Z—Y signals is not necessary to an understanding of the present invention, the following general facts are conducive to a greater appreciation of the general type of operation here involved. Analysis of the chroma-signal transmission system indicates that the output signal $E_1$ from low-pass filter 125, for example, may have the form:

$$E_1=(\cos\phi)\ (X-Y)+(\sin\phi)\ (Z-Y)$$

Here, $\phi$ represents the angular difference between the demodulating signal supplied to demodulator 111 and a reference phase of the subcarrier signal as represented by the phases of oscillations in the received subcarrier bursts. In the case of signals from filter 125, $\phi$ is zero. Accordingly, the coefficient of the Z—Y term in the above expression is zero, while that of the X—Y term is 1. Therefore, only the X—Y signal appears at the output of low-pass filter 125. On the other hand, the continuous-wave signal supplied to balanced demodulator 112 differs by 90° from the reference phase established by the subcarrier bursts. Accordingly, the coefficient of Z—Y is 1, while that of X—Y is zero, and, as a result, the output signal from low-pass filter 126 comprises substantially only the Z—Y signal without contamination by the X—Y signal.

In order to control the real red, green and blue primaries represented by the phosphor materials upon the screens of cathode-ray tubes 103, 104 and 105, it is necessary to apply the X—Y and Z—Y signals, as well as the Y signal, to these cathode-ray tubes in the proper proportions. This is accomplished by means of the electrical matrixing network now to be described. The methods for calculating the specification of any color in terms of any three primaries such as red, green and blue, when its specification in turns of three other known primaries such as X, Y and Z are available, are well known in the art of colorimetry, and need not be set forth here in detail. Thus, when the chromaticies of the red, green and blue primaries represented by the three receiver cathode-ray tubes are known, there may readily be calculated the amounts of X, Y and Z signals which should be supplied to each of the three cathode-ray tubes to effect a matching of the colors represented by these signals, and from this there may readily be determined the amounts of X—Y and Z—Y signals which should be so supplied when equal amounts of the Y signal are supplied to each tube. In the case of commercially realizable phosphor primaries approximating the so-called standard primaries "C," the voltages $V_R$, $V_G$ and $V_B$ which should be applied to the red, green and blue light-producing cathode-ray tubes respectively, may be approximately in the following proportions:

$$V_R=1.0Y+1.76(X-Y)-0.316(Z-Y)$$
$$V_G=1.0Y+0.839(X-Y)+0.085(Z-Y)$$
$$V_B=1.0Y+0.05(X-Y)+1.06(Z-Y)$$

It is understood that these values are cited for purposes of illustration only.

Accordingly, the X—Y signal from low-pass filter 125 may be supplied to amplifier 100 and red cathode-ray tube 103 by way of gain-controlling device 130 and amplifier 131, which may be adjusted to provide the proper proportions of the X—Y signal to the red cathode-ray tube. Similarly, the X—Y signal may be supplied through gain-controlling device 132 and amplifier 133, and through to the gain-controlling device 134 and amplifier 135, to the green and red cathode-ray tubes 104 and 105, respectively.

The Z—Y signal from low-pass filter 126 may then be supplied to red cathode-ray tube 103 through gain-controlling device 140 and amplifier 141, and to the green and blue cathode-ray tubes 104 and 105 through gain-controlling device 143 and amplifier 144, and through gain-controlling device 145 and amplifier 146, respectively. By appropriate adjustments of these gain-controlling devices and their corresponding amplifiers, the desired matrix parameters, such as those set forth specifically hereinbefore, which accomplish application of the X—Y and Z—Y signals to the three primary-color producing cathode-ray tubes in appropriate proportions, may be realized. It is understood that the polarity of the signals thus supplied may be controlled by the number of stages employed in each matrix amplifier, an odd number of conventional stages effecting a phase-reversal of the signal supplied thereto.

Crosstalk between the Y signals and the chroma signals is eliminated in the present system by the restriction of Y and chroma signals to mutually-exclusive frequency bands. Obviously, such crosstalk will not be objectionable until the overlap between the Y and chroma frequency channels exceeds a predetermined amount. Thus, some increase in the chroma and/or Y-signal frequency bands, or some reduction in the width of the required transmission spectrum, may be effected without appreciable adverse affects upon image appearance.

To control the sampling frequency $f_G$ of the receiver sampler 92, the phase-and-frequency controlled signals from demodulation signal generator 93 are supplied to frequency changer 94, which may operate upon the signal of frequency $f_s$ to convert it to the desired frequency $f_G$. In the instance described hereinbefore in which the frequency $f_G$ is equal to 5/3 $f_s$, frequency changer 94 may comprise the combination of a conventional circuit for multiplying $f_s$ by five, together with another conventional circuit for dividing the frequency of the resultant signal (5 $f_s$) by three, as in the case of the transmitter frequency changer 21.

It has been shown above that the separation of the Y signal into two portions at the transmitter and the receiver, by the use of filters 18, 19 and 83, 84 respectively, is not necessary in all embodiments of the invention. However, where this is done, appropriate care should be taken in the design of these filters, particularly as to their phase characteristics, so that the separated signal portions may be recombined directly at the receiver. For this purpose, filters 18 and 19 may suitably be such that the input impedance presented by the two filters in parallel is constant with frequency. Similar care should preferably be taken with receiver filters 83 and 84 as well.

Figure 6:
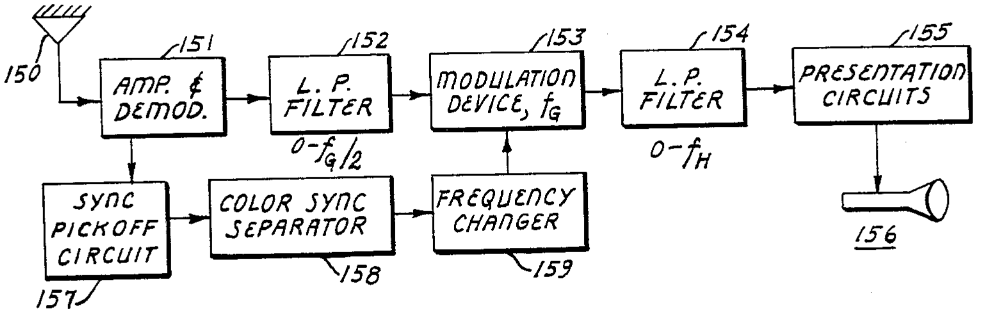
Figure 6 is a block diagram of an improved television receiver for reproducing a monochrome image from the transmissions of the transmitter of Figure 1.

Figure 6 illustrates a television receiver for producing a high-definition, black-and-white version of the color image represented by the transmissions of the transmitter in Figure 1. This receiver will produce a monochrome picture of 5 mc. apparent definition, in which the 0–1 mc. picture information is entirely devoid of residual beat patterns. The receiver comprises, in essence, the Y-signal channel of the color television receiver of Figure 2, and differs from a standard monochrome receiver principally in the addition of two lowpass filters, a modulation or gating device, and a gating frequency control circuit. The receiving antenna 150, and the amplifier and demodulator 151, may be substantially identical with those now employed in standard monochrome receivers. Following the amplifier and demodulator 151, the received signal is passed through a lowpass filter 152 having a passband 0–3 mc. corresponding to the (0–$f_{G/2}$) Y-signal portion of the transmitted signal, thus rejecting the chroma signal. The output of filter 152 is then supplied to modulation device 153, which may be similar to that employed in the Y-channel of the color receiver of Figure 2, this device being operative to modulate the Y signal with a signal having a D. C. component and a fundamental frequency $f_G$ equal to the frequency of the modulating signal at the transmitter. Higher harmonics of $f_G$, and other high-frequency extraneous signals, are rejected by bandpass filter 154 through which the output of modulation device 153 is passed, this filter having a 0–5 mc. passband. In accordance with operations similar to those described in detail hereinbefore, the signal from filter 154 then comprises a 0–5 mc. brightness signal, plus extraneous signals in the range 1–5 mc. which have opposite phases at corresponding points in successive television frames. When this signal is supplied through conventional presentation circuits 155 to a standard monochrome cathode-ray tube 156, the extraneous signals tend to cancel on successive frames, while the desired Y-signal components produce a panchromatic black-and-white version of the color image with an apparent definition corresponding to a 5 mc. video band.

The frequency $f_G$ of the modulation device 153 may be controlled accurately by selecting the color synchronizing information from the received signal through the medium of conventional sync pickoff circuit 157, color sync separator 158, and frequency changer 159. The sync pickoff circuit 157 may be of the general type of amplitude-selective vacuum tube circuit used for this purpose in standard monochrome receivers, with appropriate care taken in the adjustment thereof so that the amplitude range selected includes at least a portion of the range occupied by the burst of sampling oscillations. Color sync separator 158 and frequency changer 159 may each be of the same type described with reference to the color receiver of Figure 2, the latter device producing a signal of the frequency $f_G$ for controlling the frequency of the modulating signal component utilized in modulation device 153.

Although the invention has been described and illustrated with reference to specific embodiments thereof, it is to be understood that it is by no means limited thereby, but is instead susceptible of wide variation both as to structure and adjustment within the scope of the invention. Thus, although I have described my invention with particular relation to the transmission of intelligence representative of a color television image, it may obviously be adapted for use in transmitting any of a wide range of classes of information. Similarly, the values of the various frequencies which I have indicated specifically in my specification are intended for illustrative purposes only, and, although I have found these values to be particularly useful in the specific embodiments which I have disclosed in detail, in other applications of the invention entirely different values may be desirable. For example, the modulating frequency $f_G$ may be located further from the upper frequency limit of the information to be transmitted, so as to increase the low-frequency range left free of contaminating signals, or nearer this limit so as to decrease this range to zero thereby utilizing a narrower transmission spectrum. Further, the color-specifying parameters represented by the transmitted signals may be other than the ICI X, Y and Z parameters, where the particular conditions of application of the invention make it desirable that they be so. These and other variations and modifications of my invention will readily occur to those skilled in the art to which it relates.

I claim:

1. A transmitter of useful intelligence contained in television signals representative of variations in the brightnesses of successively-scanned elements of a televised scene, said scene being completely scanned during the period of each television frame by means of an integral number of repetitive line-scannings, said television signals comprising principally original frequency components situated substantially at harmonics of a predetermined frequency and within a predetermined frequency band, said transmitter comprising: signal modulating means including a generator of a modulating signal having a frequency situated without said television frequency band by an amount less than the width of said band and having a phase which differs by substantially 180° at times separated by said television frame period, said signal modulating means being responsive to said original television signal components to produce corresponding frequency components substantially identical in frequency and relative amplitude with said original components producing them and to generate new frequency components by heterodyning of said original signal components with said modulating signal, said new frequency components having amplitudes representative of the amplitudes of said original components producing them; signal transmitting means supplied with said corresponding components and with said new components from said modulating means to transmit said corresponding and said new components to a receiver; and frequency-selective means for supplying said transmitting means substantially only with those of said new and said corresponding components produced by different original components.

2. A transmitter of television signals representative of differences in light emission from successively-scanned elements of a televised scene, said scene being completely scanned during the period of each television frame by means of an integral number of repetitive line-scannings, said television signals occupying a predetermined frequency band extending from zero to a predetermined upper frequency limit, said transmitter comprising: signal modulating means supplied with said television signals for modulating said television signals with a modulating signal having a D. C. component and a fundamental frequency, said fundamental frequency exceeding said predetermined upper frequency limit of said television signals by an amount less than the width of said frequency band and said modulating signal being of opposite phases at times separated by said period of said television frames; a frequency-selective device supplied with said modulated television signals for passing substantially only signals of frequency less than approximately one-half said fundamental modulating frequency; and means for transmitting said signals passed by said frequency-selective device.

3. In a television transmitter: means for generating a television signal representative of variations in the light from successively-scanned elements of a television image, said signal comprising a first group of original frequency components occupying a predetermined frequency band; means for generating a modulating signal of a frequency situated exterior to said predetermined band by an amount less than the width of said band, and for heterodyning said television signal with said modulating signal to produce a side-band of said modulating signal comprising components situated within a predetermined region of said television signal frequency band; frequency-selective means supplied with said original components and with said lower-sideband components for passing substantially only frequency components situated within said predetermined region of said frequency band; and means supplied with said signals passed by said frequency-selective means for transmitting said last-named signals to a receiver.

4. The system of claim 3, in which said television signal comprises image-representing portions which, during the period of each television frame, are indicative of substantially the entire televised image, and in which said modulating-signal generating means is operative to produce a modulating signal which is in opposite phases at corresponding points in successive television frames.

5. The system of claim 3, in which said television signal generator includes means for performing an integral number of line-scannings during each frame period, and in which said modulating-signal generating means is operative to produce a modulating signal having a frequency which is substantially equal to an odd integral multiple of one-half the frequency of said line-scannings.

6. The system of claim 3, in which said frequency-selective means is characterized by having a cut-off frequency situated substantially midway between the frequency of said modulating signal and that limit of said frequency band of television signals which is more remote from said modulating frequency.

7. In a television transmitter including a source of television signals representative of variations in the light emissions from successively-scanned elements of a television image, said image being scanned substantially completely during each television frame by means of an integral number of line-scannings: first frequency-selective means supplied with said television signals for passing substantially only frequency components thereof situated between a lower frequency limit $f_L$ and an upper frequency limit $f_H$, said frequency $f_L$ being less than the bandwidth of said frequency-selective means; signal modulating means for generating a modulating signal of frequency $f_G$ and for heterodyning said modulating signal with said television signal components passed by said first frequency-selective means, said modulating frequency $f_G$ exceeding said upper frequency limit $f_H$ by an amount substantially equal to said lower frequency limit $f_L$, thereby to produce output signals comprising a lower side-band of said frequency $f_G$ extending from $f_H$ to $f_L$, said signal modulating means also comprising means for adding said signal components passed by said first frequency-selective device to said output signals; second frequency-selective means supplied with said output signals of said signal modulating means for passing substantially only signals of frequencies at least as low as one-half said frequency $f_G$ of said modulating signal; third frequency-selective means supplied with said original television signal components and having a frequency passband extending substantially from zero to said lower frequency limit $f_L$; and means for combining and transmitting to a receiver said signals passed by said second and third frequency-selective means.

8. The system of claim 7, in which said signal modulating means is operative to produce a modulating signal which is substantially in opposite phases at intervals separated by said frame period.

9. The system of claim 7, in which said signal generating means is operative to produce a modulating signal comprising a sinusoidal varying component of frequency $f_G$ and a D. C. component.

10. A transmitter for a compatible color television system, said transmitter comprising: means for deriving a signal representative of the brightness of successively-scanned elements of a television image and which occupies a predetermined frequency range extending from zero to an upper frequency limit $f_H$; means for deriving other signals representative of the chroma of said successively scanned elements of said image, said chroma signals comprising an amplitude-modulated subcarrier whose phase and amplitude are indicative of image chroma, said chroma signals occupying a predetermined frequency range extending from a lower limit $f_1$ to an upper limit $f_2$; means for heterodyning said brightness signal with a modulating signal having a frequency substantially equal to twice the lower frequency limit $f_1$ of said chroma signal to produce new brightness signal components of transposed frequency; frequency-selective means responsive to said new brightness signal components and to said original brightness components to produce an output signal comprising those of said new and of said original components having frequencies less than a value substantially equal to said lower limit $f_1$ of said chroma signal; and means for combining and for transmitting to a receiver said output signals of said frequency-selective device occupying the frequency range from zero to $f_1$ and said chroma signals occupying the frequency range $f_1$ to $f_2$.

11. In a compatible color television transmitter; color-image scanning and analyzing means for producing a brightness signal indicative of the brightness of successively-scanned elements of said color image, and for producing a chroma signal indicative of the chroma of said image elements, said brightness signal comprising original frequency components situated principally at harmonics of the television line-scanning rate and occupying a predetermined frequency band extending from zero to an upper frequency limit $f_H$, said chroma signal comprising principally frequency components situated intermediate harmonics of said line-scanning frequency and spaced about a carrier frequency $f_s$; signal modulating means supplied with said brightness signal for generating a modulating signal of frequency $f_G$ and for heterodyning said brightness signal components with said modulating signal, said frequency $f_G$ being at least as great as said upper frequency limit $f_H$ of said brightness signal but no greater than twice said limit $f_H$, and being situated at a frequency substantially midway between adjacent harmonics of said line-scanning frequency, said modulating means also being operative to transmit said original components of said brightness signal; first frequency-selective means supplied with signals from said modulating means for rejecting frequencies substantially in excess of one-half said modulating frequency $f_G$ to produce output signals comprising both original and new brightness signal components in the frequency range extending from 0 to $$\frac{f_G}{2}$$

additional frequency-selective means for limiting said chroma signal to components of frequency at least as great as a value substantially equal to said upper frequency limit $$\frac{f_G}{2}$$

of said output signals from said first frequency-selective device; means for combining said output signal from said first frequency-selective device with said chroma signals from said second frequency-selective device; and means for transmitting said combined signals upon a radio-frequency carrier.

12. The system of claim 11, in which said signal modulating means comprises a generator of a modulating signal having a fundamental sinusoidal component of said frequency $f_G$ and also having a predetermined D. C. component, a modulator supplied with said modulating signal, a first filter for supplying said original brightness signal components to said modulator, said filter passing substantially only components having frequencies in excess of a predetermined value $f_L$, said system also comprising a filter connected effectively in shunt with said modulator for combining substantially only those of said original brightness signal components having frequencies at least as low as said frequency $f_L$ with said output signals of said first frequency-selective device.

13. In a system for transmitting to a receiver useful intelligence contained in an original signal comprising a first group of original frequency components lying within a first predetermined frequency band: means for heterodyning said first group of original frequency components with a first modulating signal having a frequency located external to said first frequency band but spaced therefrom by less than the width of said band, to produce a second group of once-translated frequency components having magnitudes proportional to those of the corresponding original components producing them but having frequencies equal to the differences between said modulating frequency and the frequency of said corresponding original componests respectively; means for selecting predetermined original components from said first group while rejecting others therefrom, and for combining said selected components with components of said second group produced by said rejected components, to produce a composite signal representative of substantially all of said original components; means for transmitting said composite signal to a receiver; means included in said receiver for heterodyning said composite signal with a second modulating signal having a frequency substantially equal to that of said first modulating signal, said heterodyning of received components from said first group producing a third group of once-translated components, said heterodyning of said received components from said second group producing a fourth group comprising twice-translated components, said twice-translated components of said fourth group corresponding in frequency and relative amplitude to those components of said original signal represented by said received portion of said second group of components; means included in said receiver for combining said third and fourth groups of components with said received composite signal containing portions of said first and second groups of components, to produce a resultant signal; and frequency-selective means supplied with said resultant signal for attenuating components of said second and third groups, thereby to reduce interference with said second and third groups of components tend to produce with components in said first and fourth groups.

14. The system of claim 13, in which said original signal comprises principally components uniformly-spaced at predetermined frequency intervals, and in which said means for heterodyning said first group of original frequency components comprises a generator of a first modulating signal having a frequency which is intermediate adjacent frequencies which differ from the frequencies of each of said original components by successive integral multiples of said predetermined frequency interval between said original components.

15. In a television transmission system including a source of television signals representative of variations in the brightnesses of successively-scanned elements of a television image, said image being scanned substantially completely during each television frame period selective means supplied with said first, said second, said third and said fourth groups of components for attenuating substantially said second and third groups of once-transposed components with respect to said first and fourth groups of components which are directly representative of said original signal.

20. A receiver for reproducing useful intelligence contained in an original signal, said receiver comprising: a source of signals comprising a first group of components having amplitudes representative of the amplitudes of components of the same frequencies in said original signal, and also comprising a second group of components having frequencies intermediate those of said first group and having amplitudes representative of the amplitudes of those corresponding components of said original signal whose frequencies equal the differences between the frequencies of said respective components of said second group and a predetermined reference frequency; means for generating a modulating signal of said predetermined reference frequency and for heterodyning said first and second groups of components with said modulating signal to produce a third and a fourth group of components respectively, said fourth group of components having frequencies and relative amplitudes directly indicative of those components of said original signal represented by said second group of components; means for combining said components of said first and second groups with said components of said third and fourth groups to produce a composite signal; and a signal utilization device supplied with said composite signal and responsive principally to signals having frequencies equal to those of said components in said first and fourth groups.

21. A television receiver for producing a television image corresponding to an original television signal, said original signal being represented by a received signal comprising a first group of frequency-spaced components directly indicative of the frequencies and relative amplitudes of corresponding lower-frequency components of said original signal and also comprising a second group of components interspersed frequency-wise between said components of said first group, each component of said second group having an amplitude indicative of the amplitude of a component of said original signal whose frequency is equal to the difference between the frequency of said last-named component of said second group and a predetermined reference frequency, said receiver comprising: an image-reproducing device having light-intensity controlling means and comprising an image-displaying surface of substantial light persistence; means for generating a modulating signal component of said predetermined reference frequency; means for heterodyning said first and second groups of components of said received signal with said modulating signal component to produce third and fourth groups of frequency-translated components respectively, said components of said fourth group having frequencies and relative amplitudes corresponding directly to those of said original signals represented by said second group of components; and means for supplying said received signals and said frequency-translated components to said light-intensity controlling means of said image-reproducing device to control the formation of a television image upon said image-displaying surface.

22. The system of claim 21, in which said heterodyning means includes a circuit arrangement for transmitting said received signals to said image-reproducing device without frequency translation thereof.

23. The system of claim 21, in which said means for supplying said received signals to said light-intensity controlling means includes a frequency-selective device connected effectively in parallel with said heterodyning means for transmitting therethrough substantially only the lower-frequency portion of said first group of components.

24. A color television receiver for reproducing a color image from a received signal comprising a first band of frequency components which includes a first group of components directly representative in frequency and relative amplitude of corresponding components in an original brightness signal and which also includes a second group of frequency-translated components representative of components of said original brightness signal situated outside said first frequency band, said first band of frequency components being representative of the brightnesses of successively-scanned elements of said color image, said received signal also comprising a second band of frequency components situated outside said first band and representative of the hue and saturation of said color-image elements, said receiver comprising: an image-reproducing device comprising a plurality of sources of colored light of substantial light-persistance, said image-reproducing device also comprising brightness-controlling means for controlling the brightnesses of said colored-light sources; frequency-selective means supplied with said received signals for separating frequency components of said first and second bands into a first and a second signal channel respectively; means included in said first signal channel for generating a modulating signal component and for heterodyning said first and second groups of components with said modulating signal component to produce third and fourth groups of frequency-translated components; means for supplying said frequency-translated components and said received signals to said brightness-controlling means to control the combined brightnesses of said sources of colored light; and means for supplying said components of said second frequency band from said second channel to said brightness-controlling means to control the relative amounts of of light from said colored-light sources.

References Cited in the file of this patent

UNITED STATES PATENTS

| | | |
|---|---|---|
| 2,492,926 | Valensi | Dec. 27, 1949 |
| 2,554,693 | Bedford | May 29, 1951 |
| 2,558,489 | Kalfaian | June 26, 1951 |
| 2,580,685 | Mathes | Jan. 1, 1952 |
| 2,621,244 | Landon | Dec. 9, 1952 |
| 2,627,549 | Kell | Feb. 2, 1953 |
| 2,634,324 | Bedford | Apr. 7, 1953 |
| 2,635,140 | Dome | Apr. 14, 1953 |